(12) United States Patent
Womer et al.

(10) Patent No.: US 7,063,453 B2
(45) Date of Patent: Jun. 20, 2006

(54) ENHANCED THERMAL CONDUCTION IN APPARATUS FOR PLASTICATING RESINOUS MATERIAL

(75) Inventors: Timothy W. Womer, Edinburg, PA (US); Payton R. Lewis, Dorado, PR (US)

(73) Assignee: Xaloy, Inc., New Castle, PA (US)

( * ) Notice: Subject to any disclaimer, the term of this patent is extended or adjusted under 35 U.S.C. 154(b) by 211 days.

(21) Appl. No.: 10/784,698

(22) Filed: Feb. 23, 2004

(65) Prior Publication Data

US 2005/0185504 A1    Aug. 25, 2005

(51) Int. Cl.
   *B01F 15/06*    (2006.01)
(52) U.S. Cl. .......................... 366/79; 366/144
(58) Field of Classification Search .................. 366/79, 366/144–146, 149; 425/208, 209; 415/72
   See application file for complete search history.

(56) References Cited

U.S. PATENT DOCUMENTS

| | | | | |
|---|---|---|---|---|
| 215,372 | A * | 5/1879 | Kuehne | 165/109.1 |
| 2,313,315 | A * | 3/1943 | Blais | 165/148 |
| 3,913,660 | A | 10/1975 | Diez | |
| 4,103,800 | A | 8/1978 | Lomax et al. | |
| 4,399,198 | A | 8/1983 | Lomax et al. | |
| 4,966,544 | A | 10/1990 | Mitake | |
| 5,007,577 | A * | 4/1991 | Nakasuji et al. | 228/265 |
| 5,023,145 | A | 6/1991 | Lomax et al. | |
| 5,148,512 | A * | 9/1992 | Owens | 392/383 |
| 5,221,821 | A | 6/1993 | Burns et al. | |
| 5,231,366 | A * | 7/1993 | Haramaki et al. | 335/216 |
| 5,246,056 | A | 9/1993 | Lomax et al. | |
| 5,363,900 | A | 11/1994 | Betz | |
| 5,554,448 | A * | 9/1996 | Yamada et al. | 428/612 |
| 5,565,277 | A | 10/1996 | Cox et al. | |
| 6,486,432 | B1 | 11/2002 | Colby et al. | |
| 6,696,756 | B1 * | 2/2004 | Chang | 257/734 |
| 2005/0082038 | A1 * | 4/2005 | Korpan et al. | 165/104.21 |

OTHER PUBLICATIONS

Payton R. Lewis, "New Tooling Takes a Beating, Transfer Heating", *Injection Molding*, May 2002, 51-52, United States.
Payton R. Lewis, "Composite Metal Technology" Technical Paper, presented in Chicago, Illinois, at Regional Technical Conference of the Society of Plastic Engineers, Mar. 20, 2002.

* cited by examiner

*Primary Examiner*—David Sorkin
(74) *Attorney, Agent, or Firm*—Robert J. Herberger

(57) ABSTRACT

An apparatus for plasticating rubber, thermoset or thermoplastic materials according to this invention includes a barrel having a wall extending axially and laterally and having an outer surface and an inner surface. The wall has a thickness formed with mutually spaced holes extending at least partially through the thickness. The barrel is formed of material having a first, relatively low coefficient of thermal conduction conductors having a coefficient of thermal conduction greater than the first coefficient are each located in and engage a hole. Heat applied to the outer surface is conducted rapidly through the wall thickness along the length of the conductors to the inner surface, thereby heating and cooling material being processed located in a cavity surrounded by the wall.

11 Claims, 4 Drawing Sheets

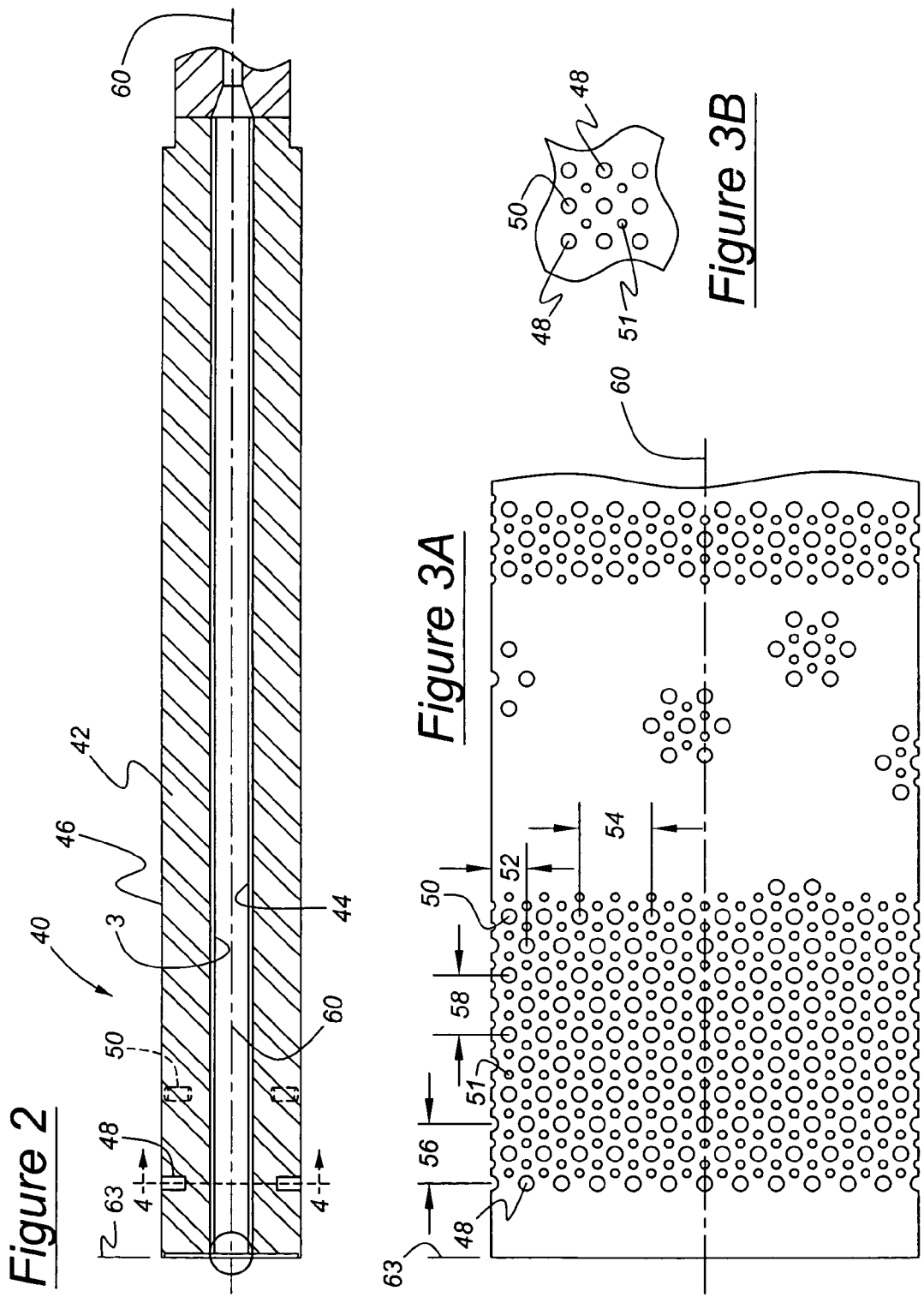

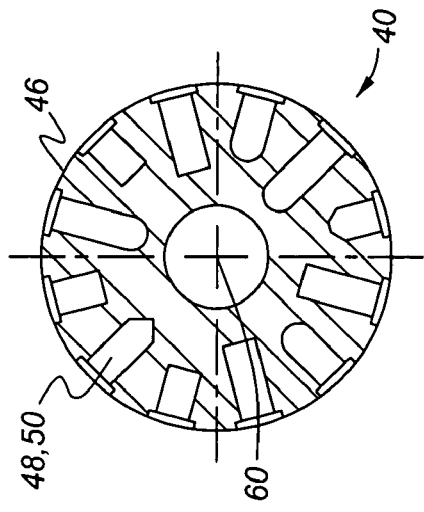
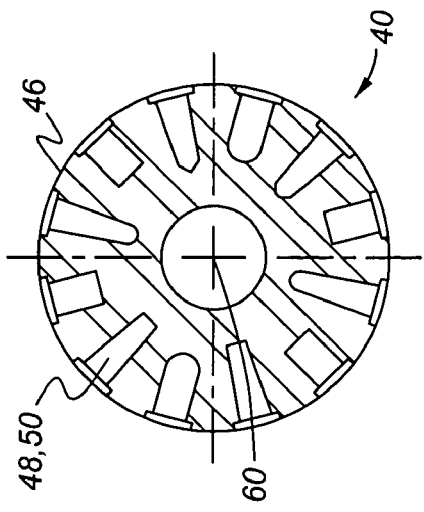
Figure 4A
Figure 4B
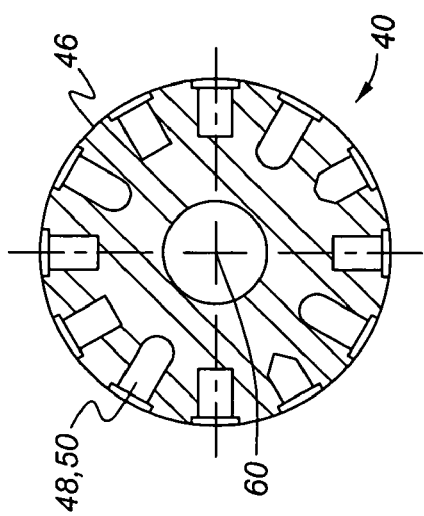
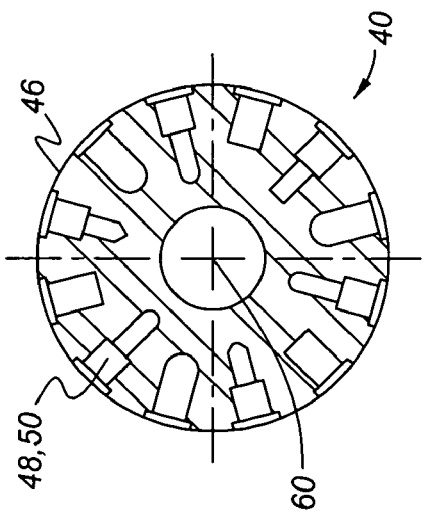
Figure 4C
Figure 4D

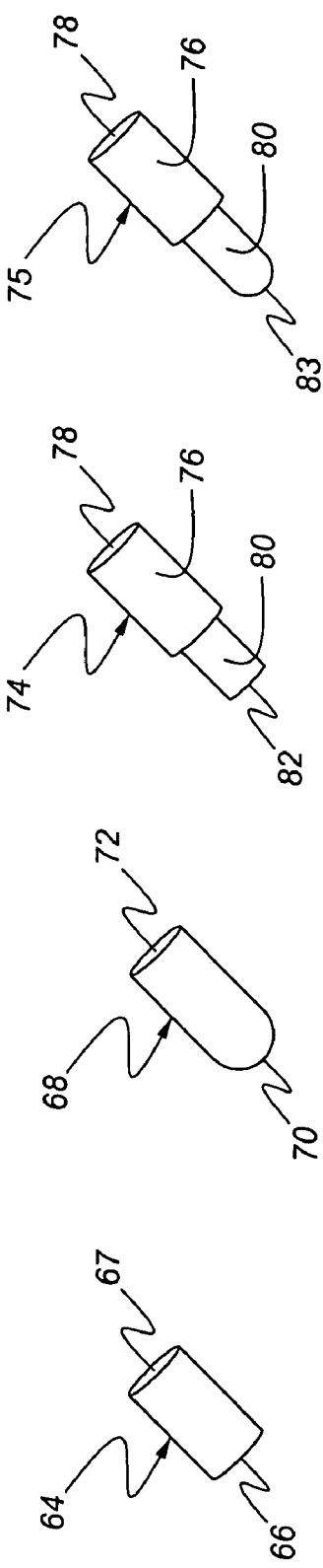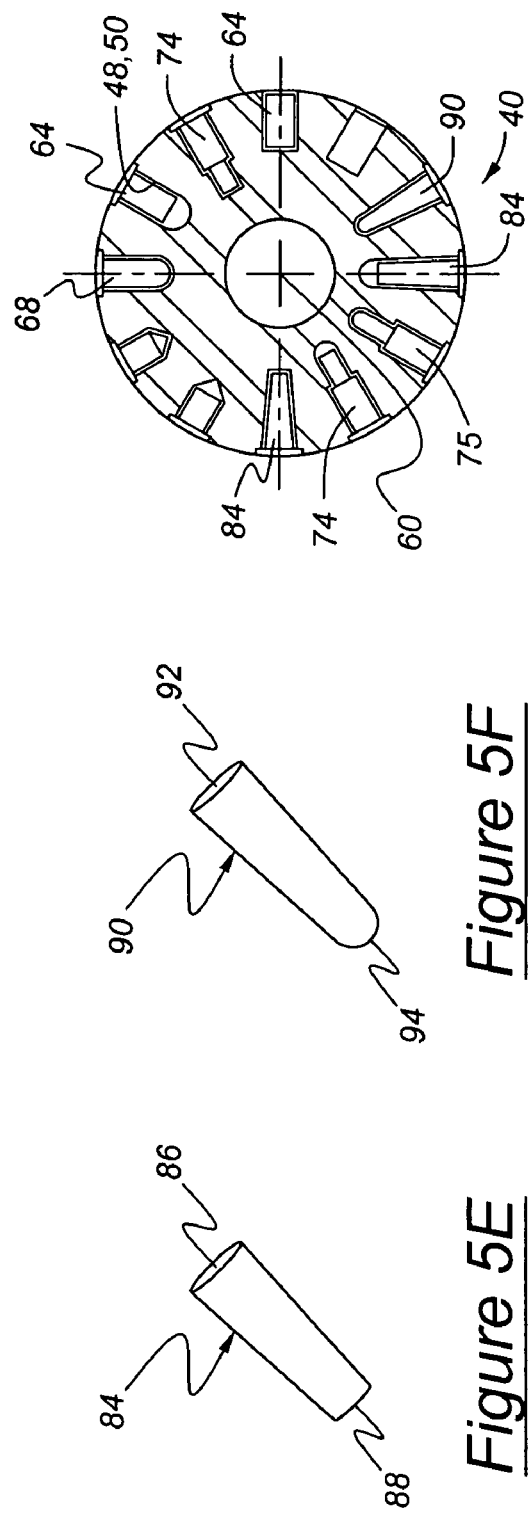

ENHANCED THERMAL CONDUCTION IN APPARATUS FOR PLASTICATING RESINOUS MATERIAL

FIELD OF THE INVENTION

This invention relates to heated, thick walled shells and plates, such as those used in a barrel for extruding or injecting rubber, thermoset or thermoplastic resinous material using a rotating screw. More particularly, the invention pertains to improving the conduction of heat from an outer surface through a wall to an interior cavity.

BACKGROUND OF THE INVENTION

The apparatus for plasticating rubber, thermoset or thermoplastic materials includes a screw rotating within a long, heated barrel. For purposes herein plasticating shall include the processing of rubber. Material in the form of pellets, granules or powders to be processed enters the barrel through an inlet port, and is transported along the barrel by a rotating screw formed with flights, which push the material forward through the barrel. As the material moves through the barrel it is heated, worked and progressively converted to a melted or molten state. The melt or molten material is delivered under pressure through a restricted outlet or discharge port to make the finished article. It is desirable that the molten material leaving the apparatus be completely melted and homogeneously mixed, resulting in uniform temperature, viscosity, color and composition.

The barrel of the plasticating apparatus has the form of an elongated, generally circular, hollow cylinder having relatively thick walls, which are heated at various axial positions by heaters located on the outer surface of the barrel. The rotating screw, which extends longitudinally through the barrel, is responsible for forwarding, melting, pressurizing and homogenizing the material as it passes from the inlet port to the outlet port. Typically, the screw has a radially inner core. The core has a helical flight along its length, the flight and a cylindrical inner surface of the barrel defining a helical space in which the material is transported to the outlet.

In general, the plasticating screw has one or more sections along its axis, each section being designed for a particular function. Ordinarily, when plasticating thermoplastics, there is a feed section, a melting section and a metering section arranged in a series. The melting section is referred to interchangeably as the intermediate, compression or transition section. The feed section extends forward from the inlet port where rubber, thermoset or thermoplastic material is introduced into the apparatus and pushed forward by the screw along the interior of the barrel. The material is then worked and heated in the melting section. After approximately 40% to 80% of the material has been masticated or plasticized, the remaining material becomes randomly dispersed within the mix. But most melting initially occurs in the melting section at or near the heat source at the inner wall of the barrel.

Throughout the history of injection molding, the injection barrel has changed primarily to improved wear resistance. A barrel must contain the injection pressure, be wear resistant and transfer heat into the plastic resin from the heating source outside the injection barrel. The less resistant the barrel is to heat transfer, the faster the resin will reach melt and the closer the process temperature can be held to a set point.

A barrel for a plasticating process, namely extrusion, injection molding, blow molding or die cast machines typically are heated by electric heater bands or liquid flowing through jackets. To achieve the proper magnitude of heat over a wide area of the barrel surface, more than one heater band or jacket is normally required. Preferably a barrel used in the process is also cooled by conduction through the barrel wall during a portion of the plasticating process in order to lower the temperature of the molten material before it is transferred from the barrel into a downstream forming process, such as a mold or die. This cooling of the material while in the barrel helps to shorten the time required to form the material, thereby decreasing the cycle time.

Non-electric jackets are used for regulating the temperature of material being processed by passing a heat transfer medium through channels located in the barrel. The medium for carrying heat energy to and from the barrel is usually water, oil or steam, whose temperature is controlled outside the barrel by a boiler, fluid heater or chiller. The heat transfer medium can also be passed through jackets on the outer surface of a plasticating barrel, which is usually made of steel and therefore is subject to corrosion caused by the accumulation of the minerals in the heat transfer medium. This method of regulating the temperature of the processed material has several disadvantages including leakage of the medium, clogging of heat transfer channels with residue, and difficulty in sealing the channels. U.S. Pat. No. 5,363,900 describes a heat control system that includes a steel mold having a fluid channel and thermally conductive pins embedded in the mold and extending into the channel. Heat is conducted to the pins from the mold body and transferred through the pins to the fluid in the channel for cooling the mold.

A thermocouple, located on the barrel, produces a signal representing surface temperature. The signal is transmitted to a temperature controller, which controls the heater on the basis of a controller set point. Electric heaters have variations that can cause contact differences between the heater and the barrel. Usually the same amount of electric power is supplied to all the heaters subject to the control of the thermocouple signal, but each heater may supply a different magnitude of electric power to the barrel surface. If one heater, distant from the thermocouple, supplies less heat to the barrel surface than another heater located closer to the thermocouple and more closely contacting the barrel, it will transmit less heat to the barrel. These variables cause hot and cold spots in the process equipment and may adversely affect the processed material.

In order to avoid these process and equipment difficulties and to shorten process time, there is a need to minimize the resistance of the barrel wall to heat transfer. This can be accomplished by raising the overall coefficient of thermal conductivity of a mold, die, or barrel, or by raising the coefficient of thermal conductivity in a particular area of such devices where more uniform or higher thermal conductivity between the resin material being processed and its heating or cooling source is required.

SUMMARY OF THE INVENTION

The invention relates to use of an easily machined or formed, highly thermally conductive material, such as aluminum or copper, preferably oxygen-free copper, as a thermal conductor to carry heat between an outer surface and the interior of a relatively thick wall pressure vessel, such as the barrel of a plasticating apparatus. The direction of heat flow is generally from the inner surface to the outer surface when cooling the processed material and in the opposite direction when heating the processed material.

An apparatus for plasticating resinous and/or rubber material according to this invention includes a barrel, preferably made of steel, having a wall extending axially and laterally and having an outer surface and an inner surface. The wall has a thickness formed with mutually spaced holes extending at least partially through the thickness. The barrel having a first, relatively low coefficient of thermal conduction. Conductors having a coefficient of thermal conduction greater than the first coefficient are each located in and engage a hole. Heat applied to the outer surface is conducted rapidly through the wall thickness along the length of the conductors to the inner surface, thereby heating material being processed located in a cavity surrounded by the wall.

Because the overall thermal conductivity of the composite wall formed of the base material and conductors of highly thermal conductive material, fitted into the base material, is much greater than that of the base material alone, the processing that employs the conductors can be operated faster than if the base material were used exclusively. Other advantages include reduction in amount of heat required to run the process, greater control of heat content of the material being processed, and increased uniformity of the process variables.

Various objects and advantages of this invention will become apparent to those skilled in the art from the following detailed description of the preferred embodiment, when read in light of the accompanying drawings.

BRIEF DESCRIPTION OF THE DRAWINGS

It is to be understood that the drawings are designed for the purpose of illustration only and not as a definition of the limits of the instant invention, for which reference should be made to the claims appended hereto. Other features, objects and advantages of this invention will become clear from the following more detailed description made with reference to the drawings, in which:

FIG. 2 is a cross section taken at a diametrical plane along the length of a barrel incorporating this invention;

FIG. 3A is a top view of the barrel of FIG. 2 showing the cylindrical outer surface unwrapped and in planform;

FIG. 3B is a top view of the barrel showing an arrangement of large and small diameter holes;

FIGS. 4A–4D are cross sections taken at transverse plane 4—4 of FIG. 2 showing various cylindrical, stepped cylindrical and conical holes into which conductors are installed;

FIGS. 5A–5F are isometric views of various conductors that are installed in holes in the barrel wall; and FIG. 6 is a cross section similar to those of FIGS. 4A–4D showing conductors located in barrel holes.

DETAILED DESCRIPTION OF THE PREFERRED EMBODIMENT

Figure 1:
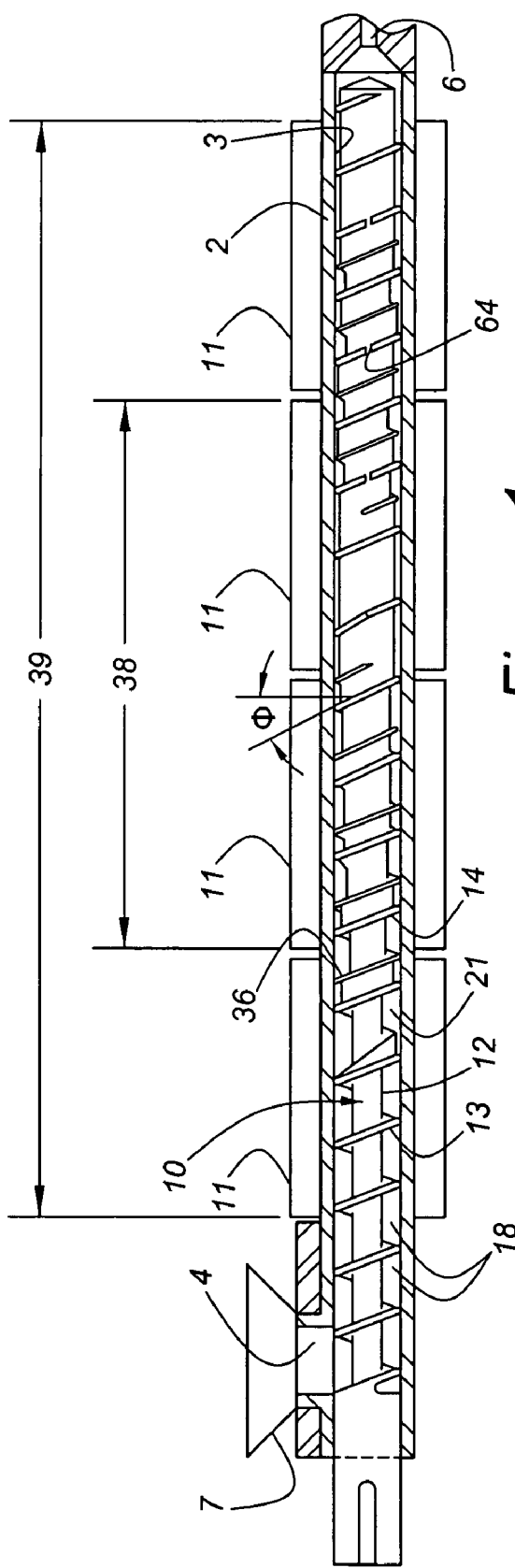
FIG. 1 is a side elevation view of a plasticating apparatus with the barrel in cross section to expose the screw.

Referring now to the drawings, there is illustrated in FIG. 1 a plasticating apparatus that includes a hollow cylindrical barrel 2 having an inner wall 3. The barrel 2 is provided with an inlet port 4 for the entry through a feed hopper 7 of one or more solid particulate resinous and/or rubber materials and any required additives or agents. The barrel 2 is also provided with a discharge or outlet port 6 for the discharge of molten plasticated material to a mold or die (not shown) or other exit configuration. Any conventional elements 11 can be provided outside of the barrel 2 for alternately applying heat to the barrel 2 and for extracting heat from the barrel. Preferably the heating/cooling elements are arranged in four discrete zones along the barrel length, as shown in FIG. 1.

Within the barrel 2 is a screw 10, which extends from the inlet port 4 to the outlet port 6 and rotates in close proximity to the inner surface of the barrel. The screw 10 includes a main helical flight 13 radially extending from and winding around a core or shaft 12, typically in a right hand threaded direction.

The main helical flight 13 includes a flight land 14, which moves in close cooperative association with the inner wall 3 of the barrel 2 with an approximate clearance therebetween of about 0.003 to 0.016 inches. The main helical flight 13 defines a helical valley 21 forming a main helical channel 18 bounded by flight 13, inner wall 3 of the barrel 2, and the surface of the core 12. The depth of the helical valley 21, the distance from the core surface to the inner wall 3 of the barrel 2, is referred to as the root depth. With the rotation of the screw 10, the helical channel 18 forces a forward flow of the resinous and/or polymer materials.

The screw 10 includes several sections located along its axial length, each section intended to achieve a particular function. As known in the art, there is typically a relatively deep root feed section for the admission, heating and working of solid resin and/or polymer material, a transition or melting section of reducing root depth for adapting the reduced volume of material due to melting and elimination of air spaces between the solid particles, and a relatively shallow root metering section, where the majority of the resin and/or polymer is predominantly in a molten state. The inlet port 4 is typically at the rear-most part of the upstream feed section, and the outlet port 6 is located at the forward-most part of the downstream metering section. As seen in FIG. 1, the melting section can be a barrier melting section, and the metering section can be multi-channel and undulating, with cut-through portions 64 to enhance mixing. However, there are many screw configurations known in the art that can be used with the instant invention, and the screw configuration should not be viewed as a limiting factor.

The barrel used in plasticating resinous material, is in the form of a hollow, circular cylinder. Referring to FIG. 2 and 3, the barrel portion 40 has a thick wall 42 and a circular cylindrical cavity, which may contain a thin inner-wall lining 44 of material having a high hardness. At least portion 40 of the outer surface 46 of the barrel contains radially directed, blind holes 48, 50, preferably arranged in a repeating pattern of axially directed staggered rows 52, 54, which appear in FIGS. 2 and 3 as horizontal rows, and angularly spaced staggered columns 56, 58, which appear as vertical columns. Rows 52 and columns 56 contain the holes 48; rows 54 and columns 58 contain holes 50. Generally the barrel is of AISI 4140 alloy steel, heat treated and hardened to Rc 28–32, having a tensile strength of about 131,000 lb/in$^2$, and an extrapolated yield strength of about 117,000 lb/in$^2$. Alternatively the barrel may be of steel having higher or lower yield strength than that of AISI 4140 alloy steel.

Although the holes 48, 50 and the conductors that are fitted in the holes may be located substantially along the entire barrel length 39, the most effective location for the holes and conductors is the portion 38 of the barrel length, extending approximately along one-half of the barrel length and located at the mid-way between the feed hopper 7 and outlet port 6 as seen in FIG. 1.

Along the portion 40 of the barrel length shown in FIG. 2 in which holes 48, 50 are formed, each hole 48, 50 is 0.800 inches deep, has a flat bottom, and a diameter of 0.495/0.500 inches For a barrel having an outside diameter of 4.724/4.716 inches and length of approximately 35.0 inches an acceptable pattern would have 12 holes in each column 56, 58, with each hole 48, 50 being spaced angularly about axis 60 in 30 angular degree increments from the next adjacent hole in the respective column. Holes 51 having a smaller diameter are shown in FIGS. 3A and 3B interspersed with holes 48, 50. Viewing FIG. 2, a leftmost column is located 3.00 inches from the left-hand end 63 in barrel portion 40. As seen in FIG. 3A, each column 56 is spaced axially 2.00 inches from the closest, angularly aligned column 56, and each column 56 is spaced axially 1.00 inches from the closest angularly nonaligned column 58. There is a total number of 36 columns, 17 columns containing holes aligned angularly with the holes of the leftmost column, and 18 columns containing holes not aligned angularly with the holes of the leftmost column. Therefore, the axial distance from the leftmost column to the rightmost column of holes aligned angularly with the holes of column 56 is 35.0 inches. The axial distance from the leftmost column to the rightmost column of holes that are not aligned angularly with the holes 56 of the leftmost column is 36.0 inches. The barrel holes having larger or smaller diameters are adjusted proportionally.

Each hole 48, 50, 51 may contain a solid cylindrical conductor 62 formed of a material having a greater coefficient of thermal conductivity than that of the material of the barrel 2 and the liner 44. In an example described, each conductor 62 fitted in a hole 48, 50 has a length of about 0.800 inches. The conductors 62 engage the holes 48, 50 with a fit that ensures their retention in the wall 42 without rising from the holes above the outer surface 46 of the barrel portion 40. The outer surfaces of the conductors may be flush with the barrel's outer surface 46. Preferably, however, the axial outer surface of each conductor is located slightly below the contour of surface 46. More specifically, the axial end of each conductor is preferably spot faced after installation as required to ensure that the radial outer conductor end is slightly below the contour of the outer surface 46 of the barrel.

FIGS. 4A–4D show that holes 48, 50, 51 may have various cylindrical forms including a right circular cylinder, a stepped-diameter right circular cylinder, and a conical cylinder. The angular spacing between adjacent holes is 30 degrees. The stepped cylindrical holes have a smaller diameter along a radial inner length of the hole, and a larger diameter along a radial outer length. FIGS. 5C and 5D show a conductor having a stepped diameter and a shoulder that is located in a stepped hole at the location where the diameter of the hole changes. The holes may have a radial depth that varies to receive a conductor, whose length preferably approximates the depth of the hole in which it is installed.

The conductors 62 also may have various cylindrical forms including a right circular cylinder, a stepped-diameter right circular cylinder, and a conical cylinder, suited for installation in holes of corresponding shape. These shapes are shown specifically in FIGS. 5A–5F. A conductor 62 may have the form of a circular cylinder 64 having flat radially inner and outer ends 66, 67; a circular cylinder 68 having a radially inner end formed with a spherical radius 70 and a flat outer end 72; a stepped cylinder 74, 75 having a large diameter radially outer length portion 76 with a flat end 78 and a smaller diameter radially inner length portion 80 with a flat inner end 82 or a spherical end 83; a truncated cone 84 having flat radially outer and inner ends 86, 88; or a cone 90 having a flat outer end 92 and a spherical inner end 94.

FIG. 6 shows cylindrical, stepped cylindrical, and conical conductors installed in holes having flat, beveled and spherical radially inner ends in the wall of the barrel 2. The beveled ends may have the form of a pointed or truncated cone. Holes having a radially inner end formed with a spherical radius or with a beveled surface have a lower magnitude of stress concentration at the base of the hole compared to holes having a flat base. Therefore, the magnitude of stress at such barrel holes due to the structural and thermal loads that occur while processing is lower. Similarly conical holes eliminate the stress concentrations that would occur at the shoulder of stepped cylindrical holes, and permit a reduced diameter at the radially inner end of the hole, which further reduces the magnitude of stress in the barrel wall.

Various analytic demonstrations have been conducted to show acceptable ranges of dimensions of hole diameters and radial depths. For example, in a circular cylindrical prototype barrel formed with spaced, staggered cylindrical holes similar to those of FIG. 2, and having a diameter of 0.495/0.500 inches, a satisfactory result was obtained when the radial depth of the holes in the rows was 0.800 inches or 1.125 inches. In another demonstration with holes having a diameter of 0.495/0.500 inches, the radial depth of holes in alternating rows can be 0.800 inches and 1.320 inches. In still another demonstration with holes having a diameter of 0.495/0.500 inches, the radial depth of holes in alternating rows can be 0.800 inches and 1.000 inch. In still another demonstration with holes having a diameter of 0.495/0.500 inches, the radial depth of holes in alternating rows can be 1.000 inch and 1.125 inches. In yet another demonstration with holes having a radial depth of 0.800 inches, the diameter of holes in alternate rows can be 0.495/0.500 inches or 0.620/0.625 inches. Another demonstration indicated that holes having a radial depth of 0.800 inches can have a diameter in the range from 0.495/0.500 to 0.745/0.750 inches. For these analytic demonstrations, the barrel had a outside diameter of 4.724/4.716 inches and an inside diameter of about 1.9689/1.9695 inches. The inner surface 3 of the barrel was subjected to a pressure of 20,000 psi. and the outer surface 46 to a temperature of 450° F. The barrel was of AISI 4140 steel, and the conductors were of copper. In each instance, the maximum Von Mises stress in the material of the barrel wall resulted in a positive, acceptable safety factor based on the yield strength of the material analyzed.

For heat to be conducted along any path in a material, there must be a difference in temperature between two mutually spaced positions in the path. If a constant temperature difference is maintained between the positions, heat Q conducted is proportional to the cross sectional area A of the path, the temperature difference $(t_h-t_c)$ (h for hotter, c for colder) between the extremities of the path length L, and the length of the period T during which the temperature difference is maintained.

$$Q=KA(t_h-t_c)T/L$$

The proportional constant for a given material is called the coefficient of thermal conductivity. In the International metric system, K is the quantity of heat in joules that passes through one square meter of cross sectional area in one second when a temperature difference of 1° C. is maintained across a distance of one meter.

With the instant invention, heaters 11 supply heat to the outer surface 46 of the barrel portion 40. To enhance the time rate of transmission of heat radially into the wall 42 from outer surface 46 each hole 48, 50 is filled with the circular cylindrical conductor 62 in the form of a plug of material having a greater coefficient of thermal conductivity than that of the liner 44 or barrel 2, including portion 40.

The table below shows the thermal conductivities of selected materials:

| Material | Thermal Conductivity - W/m ° C. |
|----------|--------------------------------|
| Aluminum | 230 |
| Air | 0.023 |
| Copper | 400 |
| Silver | 418 |
| Steel | 46 |

A preferred material for the conductors is oxygen-free copper. Oxygen-free copper is produced by remelting cathode copper, i.e., electrolytically refined copper, in an oxygen-free atmosphere, preferably an atmosphere containing hydrogen. This method provides a highly conductive copper having a thermal conductivity greater than 400 W/m° C. Oxygen-free copper is virtually pure copper, having less than 1% oxygen by weight, and more preferably as little as 0.01% oxygen by weight. When oxygen-free copper is used as a conductor and is required also to bear structural loads, then oxygen-free copper preferably contains phosphorus. This phosphoric oxygen-free copper has a lower thermal conductivity than that produced from cathode copper, however, it is strong, welds well, and is suitable where the application requires high structural strength. Oxygen-free copper can be heated and cooled repeatedly without cracking, becoming brittle, or changing its conductive properties. It has been found that heat checking, an embrittlement condition, occurs in many metallic materials. When oxygen-free copper is heated cyclically to temperatures between the ambient and about 850° F., heat checking does not occur. This advantage makes that material particularly well suited for use as heat conductors in process equipment, such a plasticating apparatus.

Its high coefficient of thermal conductivity, toughness, and ease of machining, casting and bending are distinct advantages. Therefore, it is strongly preferred that the conductors 62 are formed of oxygen-free copper. Oxygen-free copper suitable for use in accordance with this invention is available commercially from the following and other suppliers:

1. Copper No. C10100 from Anchor Bronze & Metals, Inc., Bay Village, Ohio;

2. Copper and oxygen free copper Nos.—C10200, C 11000, C10700 from William Hughes Limited, Dorset, England; and 3. Coppers from Revere Copper Products, Inc., New Bedford, Mass. having the following UNS designation name and density:

C10100 Oxygen Free Electronic—OFE; 8.94 g/cm$^3$

ASTM-B-152, ASTM-F-68, QQ-C-576 C10200 Oxygen Free OF; 5.94 g/cm$^3$

ASTM-B-152, QQ-C-576 C10300 OF Extra Low Phosphorus—DHP; 8.94 g/cm$^3$

Other highly conductive materials can be used to conduct heat according to the invention. Such materials include beryllium copper alloy, aluminum, and silver. Beryllium copper has less than half the thermal conductivity of oxygen-free copper, is more expensive than oxygen-free copper, and the beryllium presents a health risk to workers. However, beryllium copper machines well and can be formed into shapes necessary to fill drilled holes in a barrel. Aluminum has slightly more than half the thermal conductivity of oxygen-free copper, and becomes brittle from cyclic heating. Silver has about a 5% higher thermal conductivity than oxygen-free copper, however, it machines poorly, and is significantly more expensive than oxygen-free copper.

In operation, after the heaters are energized, resinous, polymer and/or rubber material to be plasticated is admitted to the barrel and the plasticating process begins. The internal radial pressure applied to the inner surface 3 of the barrel 2 may be about 20,000 psi. The temperature of the outer surface 46 near the heaters at barrel portion 40 may be about 450° F.

The conductors conduct heat from the surface 46 into the thickness of the wall 42 faster than if the wall 42 of the barrel portion 40 was uniform and formed entirely of steel, without the enhanced thermal conduction provided by the conductors 62. Due to presence of the conductors 62, the temperature along the axis 60 and around the inner diameter of the barrel is more uniform, more responsive to changes in the temperature of the heaters. Material being plasticated is heated more quickly and uniformly.

In accordance with the provisions of the patent statutes, the principle and mode of operation of this invention have been explained and illustrated in its preferred embodiment. However, it must be understood by those skilled in the art that this invention may be practiced otherwise than as specifically explained and illustrated without departing from the spirit thereof.

What is claimed is:

1. An apparatus for plasticating resinous material, comprising:
    a barrel formed of material having a first coefficient of thermal conduction, including a wall extending axially and laterally and having an outer surface and an inner surface, the wall having a thickness formed with mutually spaced holes extending at least partially through the thickness; and
    conductors having a second coefficient of thermal conduction greater than the first coefficient, each conductor located in and engaging a hole, each hole is any of a first group including a cylindrical hole, a stepped cylindrical hole and a conical holes, each hole including a radial surface and a radially inner bottom surface, the radial surface extending from the outer surface partially through the thickness toward the inner surface and the bottom surface, the bottom surface having any of a second group including a flat surface, a beveled surface, and a surface having a spherical radius; and
    each conductor is any of third group including a cylinder, a stepped cylinder and a conical cylinder, each conductor being sized to fit within its corresponding hole and to engage the radial surface of said hole.

2. The apparatus of claim 1, further comprising:
    a rotatable screw located within the inner surface, including an axial core, and a main flight arranged helically on, and extending radially from the core, and including a push surface for urging material to move along the barrel as the screw rotates.

3. The apparatus of claim 1, wherein:
    the barrel is of steel; and
    the conductors are formed of one of copper, beryllium copper, oxygen-free copper, aluminum, and silver.

4. The apparatus of claim 1, wherein:
    the barrel is of steel; and the conductors are formed of a material having a coefficient of thermal conduction that is at least four times greater than the coefficient of thermal conduction of the steel.

5. The apparatus of claim 1, wherein the holes are mutually spaced and arranged in staggered axially directed rows with adjacent rows being mutually offset laterally, and the holes are staggered in laterally directed columns with adjacent columns being mutually offset axially.

6. The apparatus of claim 1, wherein:
the radial surface extending toward the inner surface from the outer surface into the wall to a depth in the range of 50–65 percent of the thickness.

7. An apparatus for plasticating resinous material, comprising:
a barrel formed of material having a first coefficient of thermal conduction, including a wall surrounding a cavity, the wall extending axially and laterally, having an outer surface and an inner surface, and a thickness containing mutually spaced hales extending at least partially through the thickness; and
a rotatable screw located within the cavity, including an axial core, and a main flight arranged helically on, and extending radially from the core, and including a push surface for urging material to move along the barrel as the screw rotates; and
a plurality of conductors having a second coefficient of thermal conduction greater than the first coefficient, each conductor located in and engaging a bole, each hole is any of a first group including a cylindrical hole, a stepped cylindrical hole and a conical holes, each hole including a radial surface and a radially inner bottom surface, the lateral surface extending from the outer surface partially through the thickness toward the inner surface and the bottom surface, the bottom surface having any of a second group including a flat surface, a beveled surface, and a surface having a spherical radius; and
each conductor is any of a third group including a cylinder, a stepped cylinder and a conical cylinder, each conductor being sized to fit within its corresponding hole and to engage the radial surface of said hole.

8. The apparatus of claim 7, wherein the barrel is made of steel, and the conductors are formed of one of copper, beryllium copper, oxygen-free copper, aluminum, and silver.

9. The apparatus of claim 7, wherein the barrel is made of steel, and the conductors are formed of a material having the second coefficient of thermal conduction that is at least four times greater than the first coefficient of thermal conduction of the steel.

10. The apparatus of claim 7, wherein the holes are mutually spaced and arranged in staggered axially directed rows with adjacent rows being mutually offset laterally, and the holes being staggered in laterally directed columns with adjacent columns being mutually offset axially.

11. The apparatus of claim 7, wherein:
the radial surface extending toward the inner surface from the outer surface into the wall to a depth in the range of 50–65 percent of the barrel thickness.

* * * * *